United States Patent [19]

Neilson et al.

[11] Patent Number: 4,985,271

[45] Date of Patent: Jan. 15, 1991

[54] PROCESS FOR TREATING COFFEE BEANS TO MAKE A BETTER-TASTING COFFEE

[75] Inventors: Diane H. R. Neilson, Fairfield, Ohio; Sara L. R. Work, Dry Ridge; Edward L. Whaley, Cincinnati, Ohio; Steven J. Kirkpatrick, Cincinnati, Ohio; James P. McCarthy, Cincinnati, all of Ohio

[73] Assignee: The Procter & Gamble Company, Cincinnati, Ohio

[21] Appl. No.: 546,604

[22] Filed: Jun. 29, 1990

Related U.S. Application Data

[60] Division of Ser. No. 254,991, Oct. 7, 1988, abandoned, which is a division of Ser. No. 179,704, Apr. 11, 1988, Pat. No. 4,857,351, which is a continuation-in-part of Ser. No. 944,140, Dec. 19, 1986, abandoned.

[51] Int. Cl.$^5$ ................................................ A23F 5/04
[52] U.S. Cl. .................................... 426/595; 426/594; 426/388; 426/533; 426/456
[58] Field of Search ............... 426/594, 595, 388, 533, 426/456

[56] References Cited

U.S. PATENT DOCUMENTS

| | | | |
|---|---|---|---|
| 2,278,473 | 4/1942 | Musher | 426/595 |
| 3,640,726 | 2/1972 | Bolt | 426/595 |
| 4,857,351 | 8/1989 | Neilson et al. | 426/594 X |

FOREIGN PATENT DOCUMENTS 388699  3/1933  United Kingdom ................. 426/595

OTHER PUBLICATIONS

Foot, Coffee the Beverage, 1925, The Spice Mill Publishing Co.: New York, pp. 69–73.

*Primary Examiner*—Joseph Golian
*Attorney, Agent, or Firm*—Gary M. Sutter; Ronald L. Hemingway; Richard C. Witte

[57] ABSTRACT

The invention is a method for treating coffee beans to make a better-tasting and improved aroma coffee. Green coffee beans are first partially roasted to a Hunter a-color between about 3 and about 9, under roasting conditions sufficient to increase the Hunter a-color of the beans by at least about 1.5 a-color units during the partial roasting step. The partially roasted beans are then treated with either an alkaline solution comprising water and a foodgrade base, or a coffee bean extract solution comprising water and from about 1% to about 12% coffee solids. Preferably, the partially roasted beans are treated by soaking them in the solution at a temperature between about 65° F. (18° C.) and about 120° F. (49° C.) for a time between about 2 hours and about 24 hours. Then the treated beans are roasted to a Hunter L-color between about 16 and about 24, under roasting conditions sufficient to lower the Hunter L-color of the beans by at least about 10 L-color units during the final roasting step. The invention is also a roast and ground coffee composition comprising volatile and nonvolatile coffee compounds, said volatile compounds including ketones, diketones, aldehydes, methyl esters, furans, phenolics, and substituted pyrazines, wherein the volatile compounds are present in the coffee composition so that f(d) is greater than 145, where f(d)=

$$\frac{\text{ketones + diketones + aldehydes}}{\text{methyl esters}} + 30\left(\frac{\text{furfural + furfural derivatives}}{\text{phenolics + substituted pyrazines}}\right),$$

and wherein the composition has a Hunter L-color of not more than 24.

13 Claims, 6 Drawing Sheets

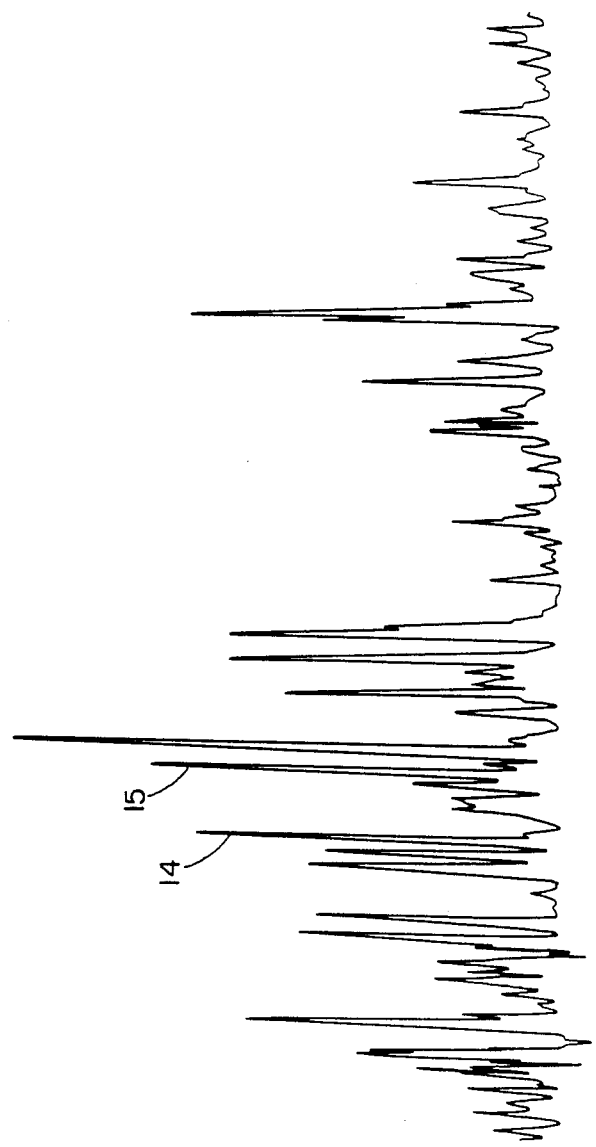

PROCESS FOR TREATING COFFEE BEANS TO MAKE A BETTER-TASTING COFFEE

This application is a divisional of application Ser. No. 07/254,991, filed Oct. 7, 1988, now abandoned, which in turn was a divisional of application Ser. No. 07/179,704, filed Apr. 11, 1988, now U.S. Pat. No. 4,857,351, which in turn was a continuation-in-part of application Ser. No. 06/944,140, filed Dec. 19, 1986, now abandoned.

FIELD OF THE INVENTION

The field of this invention is coffee bean processing and coffee compositions.

BACKGROUND OF THE INVENTION

This invention relates to a method for treating coffee beans to make a better-tasting coffee. The invention also relates to an improved roast and ground coffee product.

In the typical process for making roast and ground coffee, the coffee beans are cleaned, then blended, and then roasted at temperatures between about 350° F. and 550° F. for times between about 1 minute and 25 minutes, depending on the roaster and the desired degree of roast. The roasted beans are then ground and normalized to produce the roast and ground coffee product. Soluble coffee is generally made by countercurrently extracting roast and ground coffee, concentrating the extract, and then drying the extract. Unfortunately, coffee prepared according to these typical methods can have some harsh, bitter, or undesirable tastes.

A number of methods have been used for treating coffee beans to improve the taste or otherwise affect the coffee. For example, in U.S. Pat. No. 2,119,329 to Heuser, issued May 31, 1938, Heuser states that coffee having a richer flavor can be prepared by adding a small amount of oxidizing agent to the green coffee beans. About 0.25% by weight of the coffee of sodium hypochlorite can be added, usually by spraying the beans with an aqueous solution of the hypochlorite.

U.S. Pat. No. 1,640,648 to Cross, issued Aug. 30, 1927, discloses a process for decaffeination in which green coffee beans are first treated by an alkaline agent to convert the caffeine to an alkaloidal state, and the beans are subsequently roasted and decaffeinated in a single step.

In U.S. Pat. No. 312,516 to Schilling, issued Feb. 17, 1885, Schilling states that the full flavor and strength of coffee is brought out by coating the roasted beans with an alkaline salt, for instance bicarbonate of soda or borax. The alkaline salt is dissolved in water and sprayed onto beans still hot from roasting. The beans are subsequently ground.

U.S. Pat. No. 1,822,227 to Lendrich, et al., issued Sept. 8, 1931, discloses a process for making a better tasting coffee by decomposing the chlorogenic acid in coffee beans. The process involves treating green coffee beans with a heated solution of sodium hydroxide, potassium hydroxide, and mineral acid. The beans are subsequently neutralized before roasting.

Lastly, U.S. Pat. No. 3,644,122 to Yeransian, issued Feb. 22, 1972, discloses a process in which ground, roasted coffee or spent coffee grounds are treated with an alkaline material to provide coffee extract said to have increased yield and improved color.

It is an object of the present invention to provide a process for making a better-tasting coffee, in particular a coffee having a richer taste.

It is also an object of the present invention to interfere with the roasting reactions in a manner that results in a better-tasting coffee.

It is another object of the present invention to make the better-tasting coffee by altering the final chemistry of the coffee.

It is a further object of the present invention to make a roast and ground coffee product wherein the concentration of undesirable flavors is reduced while the concentration of good coffee flavors is retained and/or enhanced, resulting in a richer-tasting coffee.

It is another object of the present invention to make a roast and ground coffee product having a better aroma, in particular one containing less unpleasant aroma.

These and other objects of the present invention will become evident from the disclosure herein.

All percentages are by weight unless otherwise defined.

BRIEF DESCRIPTION OF THE DRAWINGS

FIGS. 2A through 2D illustrate a gas chromatogram obtained from the SDE-CGC analytical method.

SUMMARY OF THE INVENTION

Figure 1:
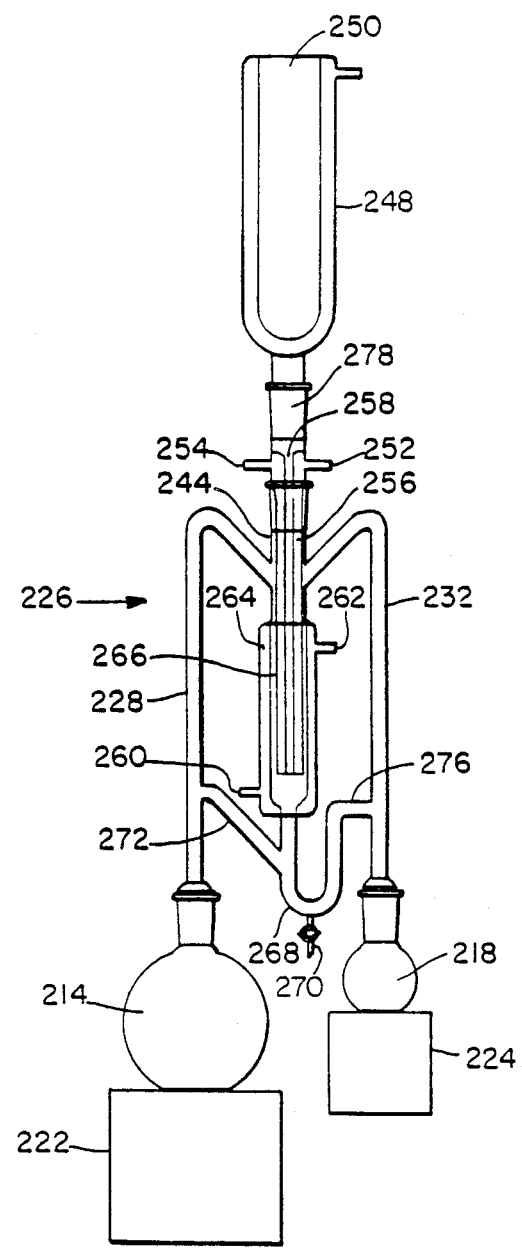
FIG. 1 illustrates the apparatus used for simultaneous distillation and extraction (SDE).
Figure 2A:
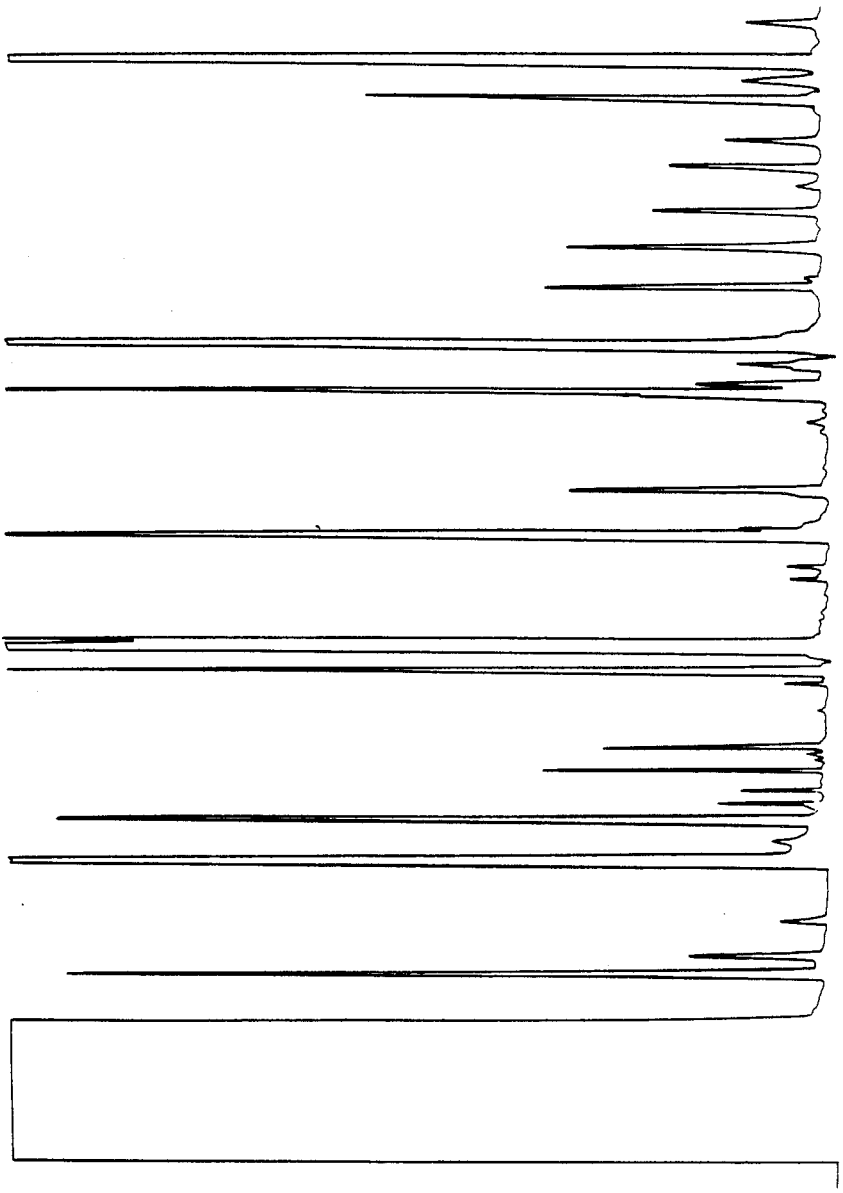
Figure 2B:
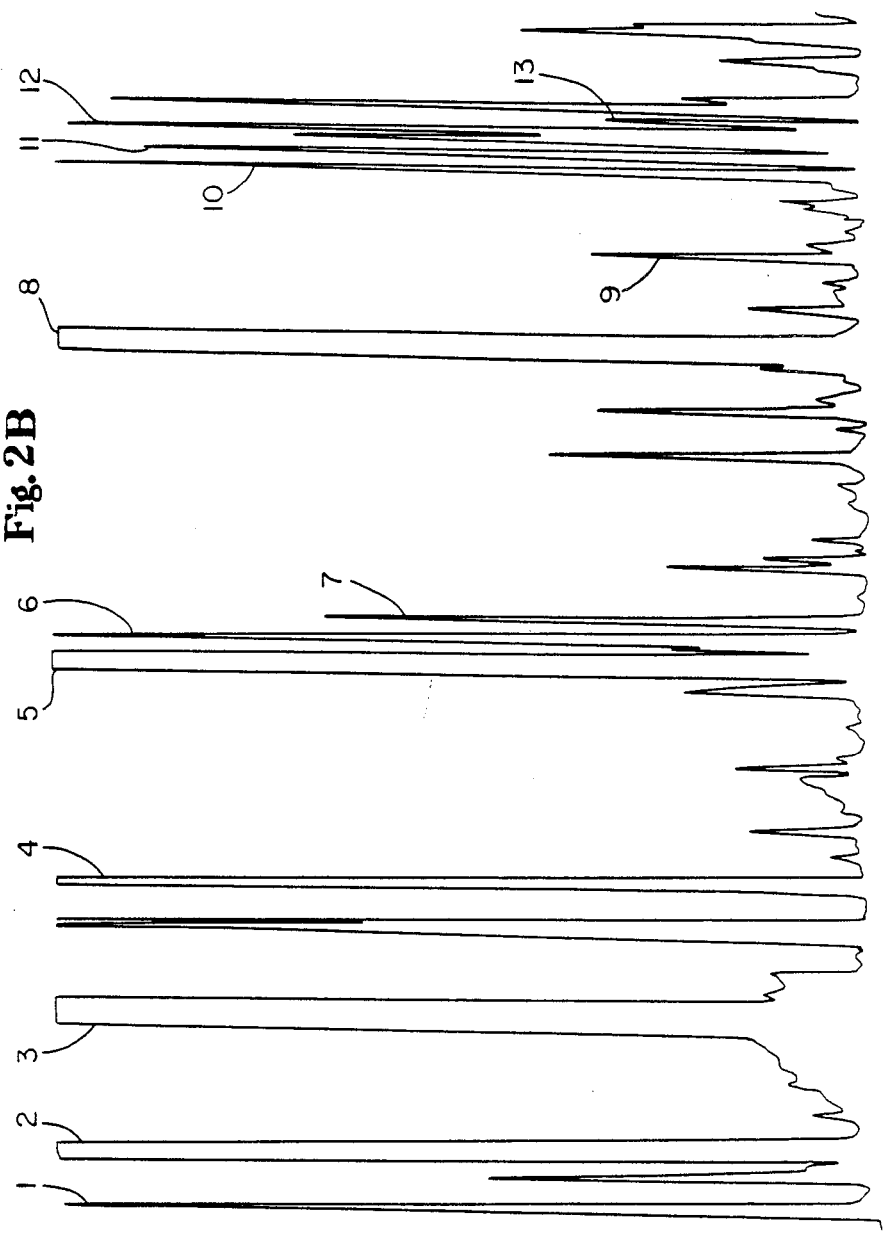
Figure 2D:
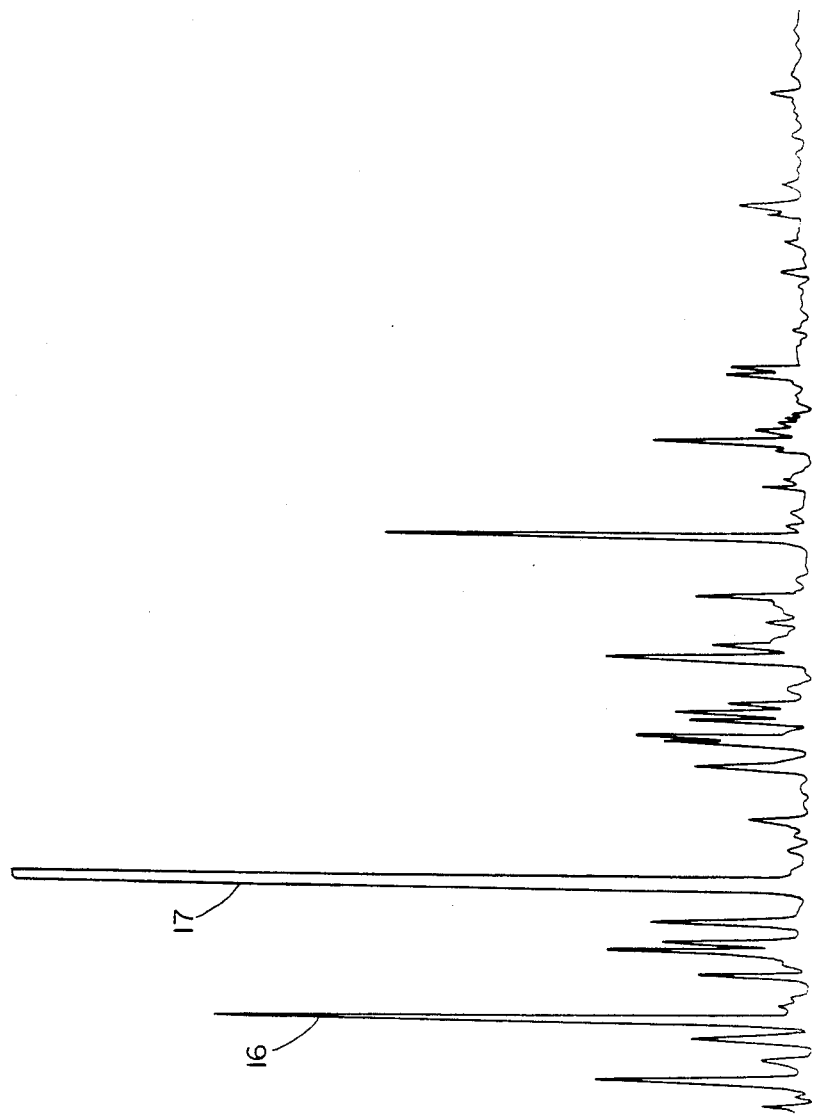

The invention is a method for treating coffee beans to make a better-tasting and improved aroma coffee. Green coffee beans are first partially roasted to a Hunter a-color between about 3 and about 9, under roasting conditions sufficient to increase the Hunter a-color of the beans by at least about 1.5 a-color units during the partial roasting step. The partially roasted beans are then treated with either an aqueous alkaline solution comprising water and a foodgrade base, or a coffee bean extract solution comprising water and about 1-12% coffee solids. A sugar is preferably added to the solution. Preferably, the partially roasted beans are treated by soaking them in the solution at a temperature between about 65° F. (18° C.) and about 120° F. (49° C.) for a time between about 2 hours and about 24 hours. Then the treated beans are final roasted to a Hunter L-color between about 16 and about 24, under roasting conditions sufficient to lower the Hunter L-color of the beans by at least about 10 L-color units during the final roasting step.

The invention is also a roast and ground coffee composition comprising volatile and nonvolatile coffee compounds, said volatile compounds including ketones, diketones, aldehydes, methyl esters, furfural, furfural derivatives, phenolics, and substituted pyrazines, wherein the volatile compounds are present in the coffee composition so that f(d) is greater than 145, where f(d) =

$$\frac{\text{ketones + diketones + aldehydes}}{\text{methyl esters}} + 30\left(\frac{\text{furfural + furfural derivatives}}{\text{phenolics + substituted pyrazines}}\right),$$

and wherein the composition has a Hunter L-color of not more than 24. The coffee composition has a richer flavor and an aroma containing fewer unpleasant notes.

DETAILED DESCRIPTION OF THE INVENTION

The present invention relates to a process for treating coffee beans to make a better-tasting and improved aroma coffee. The invention also relates to an improved roast and ground coffee product.

I. THE PROCESS

The present process comprises the steps of: (a) partially roasting green coffee beans to a Hunter a-color between about 3 and about 9, under roasting conditions sufficient to increase the Hunter a-color of the beans by at least about 1.5 a-color units during the partial roasting step; then (b) treating the partially roasted beans with either an aqueous alkaline solution comprising water and a foodgrade base, or a coffee bean extract solution comprising water and from about 1% to about 12% coffee solids, at a temperature between about 40° F. (4° C.) and about 350° F. (177° C.) for a time between about 5 seconds and about 48 hours; and then (c) final roasting the treated beans to a Hunter L-color between about 16 and about 24, under roasting conditions sufficient to lower the L-color of the beans by at least about 10 L-color units during the final roasting step.

The process involves purposefully interfering with the roasting reactions to alter the final internal chemistry of the coffee in order to make a better-tasting coffee product, in particular a coffee product having a richer taste. The partial roasting step has now been discovered to be critical, because partial roasting develops some of the flavors responsible for bad taste. These flavors are then removed by treatment of the beans with the solution. At the same time, the good flavors of the coffee are retained, reproduced and/or enhanced in the coffee beans after these partial roasting and treatment steps. Partial roasting and the subsequent treatment in solution also alter the precursors of the finished coffee flavors, in a manner that promotes the development of good flavors while suppressing the development of bad flavors. Thus, the intermediate treatment successfully interferes with the roasting reactions in a manner that favorably modifies the internal chemistry of the final product. The resulting coffee product has a richer flavor. It also has an aroma that contains fewer unpleasant notes.

The green coffee beans are partially roasted to a Hunter a-color between about 3 and about 9. Preferably, the coffee beans are partially roasted to a Hunter a-color between about 5 and about 7.5.

The partial roasting is conducted under roasting conditions sufficient to increase the Hunter a-color of the beans by at least about 1.5 a-color units during the partial roasting step, and preferably by at least about 3.5 a-color units. This degree of partial roasting is critical for the flavor improvement benefit of the invention. During the partial roasting step, the color of the beans changes from an olive green to a golden brown, and the beans begin to have a peanutty aroma. As more fully described below, Hunter a-color is believed to be the most precise indicator of degree of partial roasting, because as the a-scale increases, the coffee beans appear less green and more brown.

The following examples are illustrative, but not limiting, of process conditions that are sufficient for the initial partial roasting step of the present invention: roasting at 500° F. (260° C.) for 5½ minutes at atmospheric pressure; roasting at 530° F. (277° C.) for 4 to 6 minutes at atmospheric pressure; roasting at 600° F. (316° C.) for 3½ to 5½ minutes at atmospheric pressure; and roasting at 700° F. (371° C.) for 3 to 5 minutes at atmospheric pressure. Typically, partial roasting is conducted at a temperature between about 450° F. (232° C.) and about 750° F. (399° C.) for from about 2 to about 6 minutes, at atmospheric pressure.

The well-known Hunter color scale system is used herein to define the color of the coffee beans and the degree to which they have been roasted. A complete technical description of the system can be found in an article by R. S. Hunter, "Photoelectric Color Difference Meter," *J. of the Optical Soc. of Amer.*, 48, 985–95 (1958). Devices specifically designed for the measurement of color on the Hunter scales are described in U.S. Pat. No. 3,003,388 to Hunter et al., issued Oct. 10, 1961, and incorporated by reference herein. In general, Hunter color values are based upon measurements of tristimulus color. The Hunter "L" scale values are units of light reflectance measurement, and the higher the value is, the lighter the color is. Thus, in measuring degrees of roast, the lower the "L" scale value the greater the degree of roast, since the greater the degree of roast, the darker is the color of the roasted bean. For purposes of this invention, a change in Hunter L-color has been found to be the most accurate indicator of the extent of roasting in the final roasting step (c), because color darkening occurs primarily in this step.

In the Hunter color system the "a" scale measures color hue and chroma between red and green. As the "a" scale value increases, the coffee beans appear more brown and less green. For purposes of this invention, the "a" scale has been found to be the most accurate indicator of the extent of roasting in the initial partial roasting step (a), because during the partial roasting step the color change is primarily from green to brown.

The "b" scale measures color hue and chroma between blue and yellow. As the "b" scale value increases, the coffee beans appear more brown and more orange. Hue is analogous to the dominant wavelength, while chroma relates to the color purity. Preferably, during the partial roasting step of the present invention, the green beans will be roasted to a Hunter b-color between about 13 and about 18, under roasting conditions sufficient to increase the b-color by at least about 0.5 b-color units during the partial roasting step.

At the end of the partial roasting step, the roasting process is ended by quenching the coffee beans, typically by contacting the beans with cool water. It is preferred that the moisture content of the beans be adjusted to between about 1.5% and about 7% by weight between partial roasting step (a) and solution treatment step (b) of the present process. This low moisture content increases the ability of the beans to absorb solution during the solution treatment step. Preferably the moisture content is adjusted to between about 4.5% and about 6.5%. The lower moisture content can be achieved by using less water during the quenching or by using cool air quenching instead of water quenching. Preferably, the moisture content is adjusted by adding a pre-drying step between steps (a) and (b) of the process, where the beans are dried by any conventional method, typically by heating, for example at 240° F. (116° C.) for 15 minutes.

After partial roasting, the coffee beans are treated with either an aqueous alkaline solution comprising water and a foodgrade base, a coffee bean extract solution comprising water and from about 1% to about 12% coffee solids, or mixtures thereof, at a temperature between about 40° F. (4° C.) and about 350° F. (177° C.), for a time between about 5 seconds and about 48 hours.

The temperature and time of treatment will depend on the method used to treat the beans. A preferred method of treatment is to soak the coffee beans in the alkaline solution or extract solution. The soaking temperature is preferably between about 65° F. (18° C.) and about 120° F. (49° C.), and the soaking time is preferably between about 2 hours and about 24 hours, when the soaking is done at atmospheric pressure. After soaking, the solution is drained off, and the beans are dried to a moisture content of between about 2% and about 25%, preferably between about 5% and about 15%, and most preferably between about 8% and about 10%, before final roasting.

The soaking can also be performed under a vacuum. Use of a vacuum can either shorten the treatment time or increase the amount of solution absorbed by the partially roasted beans. The vacuum treatment is preferably performed by first mixing the beans with the solution, and then placing the beans and solution under a vacuum of between about 5" of Hg and about 29" of Hg, most preferably between about 15" of Hg and about 29" of Hg, for a time between about 5 seconds and about 1 hour, at a temperature between about 65° F. (18° C.) and about 120° F. (49° C.). The soaking time under vacuum is preferably between about 30 seconds and about 1 hour, more preferably between about 1 minute and about 1 hour, and most preferably between about 2 minutes and 1 hour. While under a vacuum, the beans are agitated to insure complete release of air. The vacuum is then released. Lastly, the beans are drained before final roasting. This method reduces the treatment time.

Alternatively, an additional step can be added to increase the amount of solution absorbed. After soaking the beans under a vacuum, the vacuum is released, and the beans are further soaked in the solution without a vacuum for a time between about 15 minutes and about 24 hours at a temperature between about 65° F. (18° C.) and about 120° F. (49° C.).

Another preferred method of treating the beans is to spray them with the alkaline solution or extract solution for a time between about 10 minutes and about 48 hours. Preferably, the beans are sprayed at a temperature between about 40° F. (4° C.) and about 350° F. (177° C.) for a time between about 10 minutes and about 20 hours. These times are for spraying at atmospheric pressure. The flow rate of spray is between about 1 gallon per hour and about 100 gallons per hour, per 50 pounds of beans, and preferably between about 45 and about 65 gallons per hour. Simultaneous steam spray can be used with the spraying, at the rate between about 5 and about 100 pounds per hour, per 50 pounds of beans, and preferably between about 30 and about 45 pounds per hour. The beans are preferably agitated during the spraying.

After spraying is complete, the beans are dried to a moisture content between about 2% and about 25%, preferably between about 5% and about 15%, and more preferably between about 8% and about 10%, before final roasting. Suitable equipment for spraying the beans with agitation would include a tumble dryer, a steam roaster, or any appropriately modified roaster.

If a vacuum is used with the spraying to reduce the spraying time, the treatment temperature is the same as spraying without vacuum, but the treatment time is preferably between about 30 seconds and about 12 hours, more preferably between about 2 minutes and about 1 hour. Preferably, a vacuum of between about 5" of Hg and about 29" of Hg is used, and most preferably between about 20" of Hg and about 29" of Hg. After spraying under vacuum is complete, the vacuum is released. At this point the beans are dried to a moisture content between about 2% and about 25%, preferably between about 5% and about 15%, and most preferably between about 8% and about 10%, before final roasting.

An additional spraying step can be used, after spraying under a vacuum and before drying, to increase the amount of solution absorbed. The additional step comprises further spraying the beans with the solution, without a vacuum, for a time between about 5 minutes and about 48 hours at a temperature between about 40° F. (4° C.) and about 350° F. (177° C.).

Whether the beans are treated by soaking or spraying, the weight ratio of solution to beans is preferably between about 0.1:1 and about 20:1, and most preferably, between about 1:2 and about 3:1.

In another preferred embodiment of the present invention, good flavor precursors are added to the alkaline solution or extract solution to further enhance the flavor of the finished product. From about 0.05% to about 27% flavor precursor will be used by weight of the solution, preferably from about 1% to about 23%. The good flavor precursors are any compounds that degrade or combine to form or enhance the conditions of formation of chemicals from the classes of ketones, diketones, aldehydes, and pyrazines (as defined below, under the product section). Preferred flavor precursors are selected from the group consisting of sugars, amino acids, and mixtures thereof. Any type of sugar can be used, such as sucrose, fructose or glucose.

After the initial steps of partial roasting and then treatment with solution, the treated beans are then subjected to a final roasting step. The final color of the roasted beans will be a Hunter L-color between about 16 and 24, and preferably between about 18 and about 22. The final roasting is conducted under roasting conditions sufficient to lower the L-color of the beans by at least about 10 L-color units during the final roasting step, and preferably by at least about 15 L-color units.

The following examples are illustrative, but not limiting, of process conditions that are sufficient for the final roasting step of the present invention: roasting at 450° F. (232° C.) for 5½ minutes at atmospheric pressure; roasting at 500° F. (260° C.) for 4½ minutes at atmospheric pressure; roasting at 650° F. (343° C.) for 3 minutes at atmospheric pressure; and roasting at 700° F. (371° C.) for 2½ minutes at atmospheric pressure. Typically, final roasting is conducted at a temperature between about 450° F. (232° C.) and about 750° F. (399° C.) for a time between about 2 minutes and about 6 minutes, at atmospheric pressure.

In the overall process of the present invention, from the green coffee beans to the finally roasted beans, the L-color of the beans will usually be lowered by between about 16 and about 28 L-color units, and preferably between about 19 and about 25 L-color units. In general, the beans are partially roasted to a Hunter L-color between about 36 and about 44, before final roasting to an L-color between about 16 and about 24. As an example, a typical blend of green coffee beans would have an initial L-color of about 42, an L-color of about 39 after the partial roasting step, and an L-color of about 20 after the final roasting step. Green coffee bean blends high in Robustas would have a lower initial L-color because green Robusta beans are naturally darker.

The alkaline solution used in the solution treatment step is an aqueous alkaline solution comprising water and a foodgrade base. The type of base used is not critical. Among the useful bases are sodium hydroxide, ammonium hydroxide, calcium hydroxide, ammonium bicarbonate, and mixtures thereof. Ammonium hydroxide is a preferred base because along with raising the pH, it provides a nitrogen precursor which is thought to enhance the formation of good flavors in the present coffee. The alkaline solution obviously must have a pH above 7. Preferably, it will have a pH above about 8, and most preferably above about 8.5. Preferably, the aqueous alkaline solution comprises water and from about 1 ppm to about 100 ppm of the base, most preferably from about 15 ppm to about 50 ppm of the base.

The coffee bean extract solution used in the solution treatment step of the present invention comprises an aqueous extract of ground coffee beans, preferably an extract of unroasted or partially roasted beans. The extract will comprise between about 1% and about 12% coffee solids, and preferably between about 3% and about 6% coffee solids, in addition to water. This level of solids will reduce the loss of coffee solids from the beans into the extract solution during the treatment step of the present process. The extract solution is made, for example, by grinding green coffee beans, and then mixing them with water for a time between about 1 hour and about 30 hours. Preferably the beans are coarsely ground, but finer grinds are also acceptable. The mixing time will depend on the method used: soaking in a container is done for a time between about 12 hours and about 30 hours, preferably between about 18 hours and about 30 hours, most preferably about 24 hours; whereas extraction in a column is done for a shorter time, between about 1 hour and about 12 hours, preferably between about 1 hour and about 6 hours, most preferably about 3 hours. After mixing, the extract solution is decanted off the coffee grinds and collected. Besides extracting green coffee beans, the extract solution can also be made by extracting partially roasted coffee beans. The beans can be partially roasted to the extent described above for the partial roasting step of the present process: to a Hunter a-color between about 3 and about 9, under roasting conditions sufficient to increase the Hunter a-color of the beans by at least about 1.5 a-color units during the partial roasting. The water used for extraction will generally be at ambient temperature, about 72° F. However, the temperature of the water used to make the extract solution can vary between about 50° F. and about 200° F. During extraction, the weight ratio of the water to the beans will be between about 9:1 and about 1:1, preferably between about 7:1 and about 2.5:1, and most preferably between about 5:1 and about 4:1.

Preferably, a foodgrade base is added to the coffee bean extract solution, at a level between about 1 ppm and 1000 ppm (by weight of the solution), preferably at a level between about 20 ppm and about 250 ppm, and most preferably between about 30 ppm and about 50 ppm. Among the useful bases are sodium hydroxide, ammonium hydroxide, calcium hydroxide, ammonium bicarbonate, and mixtures thereof.

The process of this invention works with any starting blend of green coffee beans. The three major types of coffee beans are milds, Brazilians, and Robustas. Botanically, the milds and Brazilians are traditionally thought of as Arabicas.

The milds give coffee brews which are fragrant and acidic. Brazilian beans result in coffee brews which are relatively neutral flavored. The Robusta beans produce brews with strong distinctive flavors that possess varying degrees of dirty or rubbery notes. Traditionally, the milds are the most expensive of the three types of beans, with Brazilians being of intermediate expense, and Robustas being least expensive.

Best results are obtained with a high quality starting blend of coffee beans. For example, preferably less than about 50% of the beans should be the lower quality Robustas, while more than about 50% of the beans should be the higher quality Arabicas. Since the present process retains the good flavors of the starting beans, it follows that a better product will be obtained when the starting beans contain more good flavors. However, any type of coffee is improved by the process.

Any of the variety of roasting methods known to the art can be used in the process of this invention. In the normal operation of preparing conventional roast and ground coffee, coffee beans are roasted in a hot gas medium, either in a batch process or a continuous process. The roasting procedure can involve static bed roasting as well as fluidized bed roasting.

Typically roasting equipment and methods for roasting coffee beans are described, for example, in Sivetz et al., *Coffee Technology*, Avi Publishing Company, Westport, Conn., 1979, pp. 226-246. U.S. Pat. No. 3,964,175 to Sivetz, issued Jun. 22, 1976, discloses a method for fluidized bed roasting of coffee beans.

After final roasting, the coffee beans are processed according to standard procedures, typically by cracking, grinding and normalizing. A Gump grinder, manufactured by B. F. Gump Company, Chicago, Ill., contains both cracking and grinding rolls. Also suitable is a Fitzmill hammer mill, manufactured by Fitzpatrick Manufacturing Co., Elmhurst, Ill. Some different equipment and methods for cracking, normalizing, and grinding coffee are found in Sivetz et al., *Coffee Technology*, Avi Publishing Company, Inc., Westport, Conn., pp. 265-276 (1979).

The standard grinds (from coarsest to finest) are electric perk, regular, automatic drip coffee, drip, and fine. Grinding of the coffee can be done in any of the ways known to those skilled in the art.

Examples of suitable normalizers are a Gump normalizer or a ribbon blender. The equipment can be modified (especially in length) for optimum industrial use.

If desired the roast and ground coffee can be further processed to make soluble or "instant" coffee. Instant coffee processing generally involves three basic steps: countercurrently extracting roast and ground coffee with aqueous extraction liquor, concentrating the resulting extract, preferably to at least a 50% solubles concentration, and finally drying the extract to provide a dry instant coffee product. Any of the well-known methods for making instant coffee can be used. Methods and equipment for making instant coffee are described in Sivetz et al., *Coffee Technology*, at pages 317-524.

II. THE COFFEE PRODUCT

Another aspect of the present invention is a roast and ground coffee composition that, when brewed, makes an improved coffee beverage. As mentioned above, the coffee tastes richer than standard coffees and it has an improved aroma that contains fewer unpleasant aroma notes. The coffee composition can be made according to the process of this invention, but it is not limited to this process.

The roast and ground coffee composition comprises volatile and nonvolatile coffee compounds; said volatile compounds including compounds from the classes of ketones, diketones, aldehydes, methyl esters, furfural, furfural derivatives, phenolics, and substituted pyrazines, wherein the volatile compounds are present in the coffee composition so that f(d) is greater than 145, where f(d)=

$$f(d) = \frac{\text{ketones} + \text{diketones} + \text{aldehydes}}{\text{methyl esters}} +$$

$$30 \left( \frac{\text{furfural} + \text{furfural derivatives}}{\text{phenolics} + \text{substituted pyrazines}} \right).$$

Preferably, f(d) is greater than 158, more preferably f(d) is greater than 170, and most preferably f(d) is greater than 183.

"f(d)" is a function that differentiates the present roast and ground coffee composition from previously existing coffee products. The function is defined by the above equation. An f(d) value greater than 145 is critical for the improved taste of the coffee composition.

The composition must have a Hunter L-color of not more than 24.

In general terms, the present coffee composition retains the concentration of volatile compounds that enhance the flavor and aroma of the coffee. Surprisingly, the composition has lower concentrations of compounds indicating "bitter" or "bad" flavor that are usually present along with the compounds indicating good flavors. The ratio of good flavors to bad flavors is increased without the loss of overall flavor strength. This results in a richer-tasting coffee.

The present coffee composition is different from the wide variety of previously existing roast and ground coffees, including coffees prepared by standard processing techniques and also including toddy coffees, coffee beverages prepared by slow, low temperature extraction of roasted coffee beans. This difference is unexpected in view of the wide variations in volatile concentrations in the different types of previous roast and ground coffee compositions.

Definitions

By "roast and ground coffee composition" is meant roast and ground coffee as contrasted with soluble coffee. It is within the scope of this invention to include roasted coffee beans that have not yet been ground.

By "volatile compounds" is meant coffee flavor and aroma volatiles as the term is known to the art. Sivetz et al. in *Coffee Technology*, the AVI Publishing Co., Inc. (1979) display a list of coffee volatiles at pages 409 and 412 and generally discuss coffee volatiles at pages 563–566.

By $\frac{\text{"ketones} + \text{diketones} + \text{aldehydes"}}{\text{methyl esters}}$ is meant $$\frac{\text{ketone } GC \text{ counts} + \text{diketone } GC \text{ counts} + \text{aldehyde } GC \text{ counts}}{\text{methyl ester } GC \text{ counts}} \text{ and by}$$

$\frac{\text{"furfural} + \text{furfural derivatives"}}{\text{phenolics} + \text{substituted pyrazines}}$ is meant -continued
$$\frac{\text{furfural } GC \text{ counts} + \text{furfural derivative } GC \text{ counts}}{\text{phenolic } GC \text{ counts} + \text{substituted pyrazine } GC \text{ counts}},$$

where GC counts are the normalized GC counts determined by the analytical methods described herein.

For the purposes of this invention, the GC counts for the classes of compounds (ketones, diketones, etc.) are determined by combining the GC counts of the following compounds in those classes:
ketones: 2-propanone, 2-butanone.
diketones: 2,3-butanedione, 2,3-pentanedione.
aldehydes: 2-methylbutanal, 3-methylbutanal, ethanal.
methyl esters: methylacetate, methylformate.
furfural and furfural derivatives: furfural, 5-methylfurfural, furfuryl acetate, furfuryl alcohol.
phenolics: phenol, guaiacol, ethylguaiacol, vinylguaiacol.
substituted pyrazines: methylpyrazine, 2,6-dimethylpyrazine, 2-ethylpyrazine, 2,3-dimethylpyrazine, 2-ethyl-6-methylpyrazine, 2-ethyl-3-methylpyrazine, 2,3,5-trimethylpyrazine, 2-ethyl-3,6-dimethylpyrazine.

While the present process can be used to make roast and ground or soluble coffee, the present claimed coffee composition is limited to nondecaffeinated roast and ground coffees.

III. ANALYTICAL METHODS

Capillary Gas Chromatographic Analysis of Volatile Coffee Components Separated and Concentrated by Simultaneous Distillation and Extraction (SDE-CGC)

A. Principle

The steam distillation/extraction method of Schultz et al., *J. Agric. Food Chem.*, 25, 446–449 (1977), followed by capillary gas chromatography, is used to analyze the following volatile components of the present coffee product: furfural, furfural derivatives, phenolics, and substituted pyrazines.

The first step is simultaneous distillation and extraction (SDE). FIG. 1 is a drawing of the apparatus used for this process. The volatile components are steam distilled from a coffee sample. These volatiles are co-condensed with Freon 11. The volatile components are extracted by the Freon 11. The co-condensed water and Freon 11 are allowed to separate and returned to their respective flasks. Thus, the volatile components are extracted and concentrated in the Freon 11. After ninety minutes the volume of Freon is reduced by evaporation and methylene chloride (dichloromethane) is added to reduce the loss of extracted volatiles prior to evaporation to a specific volume. The extract is not allowed to evaporate to dryness.

The extract obtained by SDE is analyzed by capillary gas chromatography (CGC) using a Hewlett-Packard 5880A Gas Chromatograph and a fused silica column, available from Hewlett-Packard Co. of Palo Alto, Calif. A DB5 column is used with a flame ionization detector (FID) to detect the carbon and hydrogen in volatile compounds in the SDE extract. A Hewlett-Packard level four data terminal is used to process the data, giving retention times, peak areas and area percents. The methylene chloride (solvent) peak is excluded from the data.

The data obtained by the SDE-CGC method are sufficiently accurate and precise to be valid for a comparison of differences in composition of coffee samples.

B. Sample Preparation

A sample of the present roast and ground coffee composition is brewed in a General Electric (Black & Decker) Model DCM 15 automatic drip coffeemaker according to the procedure described below. Two hundred ml. of the resulting brew is placed in a 500 ml. round bottom flask. Then 3 ml. of internal standard solution and 3 boiling stones are added to the flask.

The amount of roast and ground coffee used to make the brew depends on the type of grind of the coffee (i.e., electric perk, regular, ADC, drip, or fine). For example, with electric perk grind, 43.2 grams of coffee is brewed with 1420 ml. of water in the coffeemaker; while with regular grind, 41.2 grams of coffee is brewed with 1420 ml. of water.

Table 1 below explains the definition of the grinds and discloses the amount of coffee used to make the brew. To obtain the particle size distribution, 100 grams of ground coffee is placed into the top screen. The screens are in the following order: 12, 16, 20, 30, pan, with #12 on the top and the pan on the bottom. The screens are placed on a standard Ro-tap sieve shaker for 3 minutes. After shaking, the individual fractions contained in the screens are weighed and recorded as percent particle size distribution (PSD).

TABLE 1

| | U.S. Standard Testing Sieve | | | | | Average Particle Sizes | Grams coffee to use | Mls. water to use |
| --- | --- | --- | --- | --- | --- | --- | --- | --- |
| | On 12 | On 16 | On 20 | On 30 | Pan | | | |
| Tyler Equiv. Mesh | 10 | 14 | 20 | 28 | Pan | | | |
| Opening in millimeters | 1.70 | 1.18 | | | Pan | | | |
| Opening in micrometers | | | 850 | 600 | Pan | | | |
| Opening in inches | .0661 | .0469 | .0331 | .0234 | Pan | | | |
| % Particle Breakout | | | | | | | | |
| Electric Perk | 3–7 | 25–35 | 33–43 | 8–18 | 8–18 | 1085 | 43.2 | 1420 |
| Regular | 0–4 | 20–30 | 40–50 | 10–20 | 8–18 | 1030 | 41.2 | 1420 |
| ADC | 0–2 | 12–20 | 35–49 | 18–30 | 12–22 | 940 | 38.4 | 1420 |
| Drip | 0–1 | 4–10 | 30–45 | 25–40 | 15–25 | 850 | 38.4 | 1420 |
| Fine | 0–1 | 0–4 | 18–28 | 42–52 | 25–35 | 735 | 36.0 | 1420 |

C. Internal Standard Preparation

Any suitable standard can be employed herein. Isoamyl acetate is preferred and is dissolved in methylene chloride (5 microliters diluted to 100 ml).

D. SDE Procedure

1. The apparatus is set up as shown in FIG. 1.

The apparatus includes a sample flask 214 and a solvent flask 218. The sample flask 214 is heated by a stirrer-hot plate 222 while flask 218 is heated by hot plate 224. Positioned on top of flask 214 and 218 is a steam distillation/extraction (SDE) column 226 which includes a sample vapor column 228 which receives vapors from the coffee sample and a solvent vapor column 232 which receives vapors from flask 218. The top sections of the vapor columns 228 and 232 are joined to condenser column 244. Mounted on top of condenser column 244 is a Dewar condenser 248 provided with a core 250 for receiving coolant.

Condenser column 244 is provided with a water inlet 252 and a water outlet 254 for the circulation of water through a first cooling system 256 which cools core 258 of column 244. Column 244 is also fitted with a second water inlet 260 and a second water outlet 262 for circulation of water through a second cooling system indicated by 264 which cools the periphery 266 of column 244.

Vapors which condense in core 258 and along periphery 266 are collected in U-tube 268 connected to the bottom end of condenser 244. Tubing section 272 connects trap 268 to sample column 228 for passage of condensed vapors to flask 214. Tubing section 276 connects trap 268 to solvent column 232 for passage of condensed vapors to flask 218. The cooling water is circulated through systems 256 and 264 and the Dewar condenser core 250 is filled with dry ice.

2. The Freon 11 is redistilled before using it. About 150 ml. of Freon is collected in a 250 ml. flask 218 to be used as the extracting solvent.

3. The Freon 11 is drained from the U-tube 268 through a stopcock 270 when the liquid level reaches the "Y" part 272 of the U-tube.

4. The coffee sample is prepared while the Freon 11 is being redistilled.

5. After the Freon redistillation is complete, the Freon is drained through the stopcock until the liquid level is in the middle of the "Y" junction.

6. Distilled water is added through the connection 278 where the Dewar condenser 250 fits onto the top of the water condenser 256, until the water liquid level reaches the bottom of the large outer water condenser 260.

7. Three boiling stones are added to flask 218 containing the redistilled Freon.

8. The 500 ml. flask 214 containing the coffee solution is connected.

9. Ice is added to a plastic reservoir which is then used to immerse U-tube 268.

10. Distillation is carried out for 1-½ hours after water vapor and Freon 11 begin condensing and collecting in U-tube 268.

11. The heat to the coffee solution in flask 214 and the Freon 11 in flask 218 is turned off at the end of the distillation period. After the coffee solution stops boiling, the distillation apparatus is disassembled.

12. The Freon 11 is drained out of U-tube 268 until the liquid level is at the Y-junction of the U-tube 268 and tube 272. It is then poured into a flask 218 with the rest of the Freon 11.

13. The Freon 11 is evaporated down to about 5 ml. under nitrogen on a steam bath set at 60° C. (140° F.) to 71° C. (160° F.).

14. Eight ml. of dichloromethane is added to the flask containing the Freon 11 and swirled.

15. The contents of the flask containing the Freon 11 and dichloromethane are evaporated down to about 3 ml.

16. A portion of the extract is transferred into a 2 ml. reaction vial.

17. The extract in the reaction vial is evaporated down to 1 ml. and portions of extract from the flask are added to the vial and partially evaporated to 0.5 ml. until the flask is empty. Two ml. of dichloromethane are added to the flask and swirled. The solvent wash from the flask is added to the reaction vial and partially evaporated to 0.5 ml. The extract in the reaction vial is evaporated to 0.3 ml. if it is to be injected into the gas chromatograph; otherwise, it is evaporated to 0.5 ml. and put into a freezer until prior to gas chromatograph injection, at which time it is evaporated to the 0.3 ml. level. The extract is not evaporated to dryness.

E. Gas Chromatographic Analysis; Conditions for the HP 5880A g.c.

| Septum purge flow | 1 ml./min. |
| --- | --- |
| Inlet pressure | 26 psig |
| Vent flow | 30 ml./min. |
| Make-up carrier flow | 30 ml./min. |
| FID: | |
| Hydrogen flow rate | 30 ml./min. |
| Air flow rate | 400 ml./min. |
| Column flow | 3 ml./min. |
| Split ratio | 10/1 |

Temperature Program

After the sample is injected the oven is maintained at 25° C. for 2.6 minutes. The oven is then programmed to rise 20.0° C./min. to a temperature of 45° C. and is held at 45° C. for 7 minutes. Then the oven rises at 3.0° C./min. to a temperature of 65° C. and is held at 65° C. for 6 minutes. Then the oven rises at 2.0° C./min. to a temperature of 125° C. and is held at 125° C. for 1 minute. Finally the oven rises at 3.0° C./min. to a temperature of 220° C. and is held at 220° C. for 6 minutes. The oven is then heated to 230° C. and held there for 15 minutes. Minor variations may be made to the temperature program to provide adequate resolution.

The DB5 gas chromatography column used to detect and separate the organic compounds are 60 meter columns of 0.322 mm. inner diameter. A film of crosslinked polyethylene glycols 1 micron thick is used. The DB5 column is availabe from J&W Scientific, Inc., Cardova, Calif.

The chromatogram is analyzed by determining the area of each peak which is proportional to the gas chromatographic (GC) counts (digitized electrical impulses proportional to GC peak areas).

The gas chromatographic counts of each peak of the sample as obtained from the chromatogram are normalized to make all of the samples on the same basis for comparison by ratioing the GC counts of each peak to the GC counts of the internal standard.

FIGS. 2A through 2D illustrate a gas chromatogram from the SDE-CGC analytical method. The peaks are labeled by numbers 1 through 17 which correspond to the following compounds: methylpyrazine (1); furfural (2); furfuryl alcohol (3); internal standard (4); 2,6-dimethylpyrazine (5); 2-ethylpyrazine (6); 2,3-dimethylpyrazine (7); 5-methylfurfural (8); phenol (9); furfuryl acetate (10); 2-ethyl-6-methylpyrazine (11); 2,3,5-trimethylpyrazine (12); 2-ethyl-3-methylpyrazine (13); 2-ethyl-3,6-dimethylpyrazine (14); guaiacol (15); ethylguaiacol (16); and vinylguaiacol (17).

Programmed Temperature Gas Chromatography Analysis of Headspace Over Coffee Solution A. Principle and Scope Programmed temperature gas chromatography analysis is used to analyze for the following volatile components in the present coffee product: diketones, ketones, methyl esters and aldehydes. A salt (sodium sulfate) and a volatile internal standard are added to a coffee brew sample (prepared as previously described) inside a closed system. After heating, a headspace sample is taken and injected into a gas chromatograph. The gas chromatograph used is a Hewlett-Packard model 5830, available from Hewlett-Packard Co. of Palo Alto, Calif. The chromatograph is equipped with a flame ionization detector (FID) to detect the carbon and hydrogen in the volatile components. The column used is a $10' \times \frac{1}{8}''$ o.d. nickel steel packed with 0.2% Carbowax 1500 on 80/100 mesh Carbopack "C", available from Supelco Chromatography Supplies, Bellefonte, Pa. The volatile component peaks are identified by reference to a standard chromatogram. The area of each peak is counted as gas chromatographic counts. The area of an individual component is then ratioed to the area of the internal standard so as to put the values of all samples on the same basis for comparison.

B. Salt Preparation

Into a disposable polyethylene (or plastic coated paper) cup is weighed 13.00±0.03 g of sodium sulfate. This is transferred via a small plastic transfer funnel to a 120 ml septum bottle. Using a spatula, both the cup and the funnel are tapped to insure essentially complete transfer of the sodium sulfate into the bottle. The bottle is stoppered with a septum.

C. Sample Preparation

A brewed sample of the present roast and ground coffee is obtained as described above in section B of the SDE-CGE analytical method.

D. Internal Standard Preparation

A 1000 ml volumetric flask is filled with distilled water to within 5–10 cm of the calibration mark. With a pipet, 1 ml of reagent grade ethyl acetate is added to the flask. The ethyl acetate should be dispensed into the flask by lowering the tip of the pipet just below the surface of the water and tipping the flask (and pipet) slightly so that when the ethyl acetate is released, the droplets will rise to the surface free of the pipet. When the ethyl acetate has stopped flowing, the pipet is raised inside the flask neck and the final few drops are "tipped off." The flask is stoppered, inverted, and mixed by swirling and inverting it five to ten times. Then the flask is set down and the air bubbles are allowed to rise. The flask is brought to volume with distilled water. Again, it is mixed well. This flask contains 1000 ppm (v/v) ethyl acetate and may be used for five days.

E. Gas Chromatographic Analysis:

Conditions for the Analysis
The conditions for analysis are given below:
Carrier gas: helium - 25 ml/min Injection port temperature: 302° F. (150° C.)
Flame ionization detector:
Temperature: 482° F. (250° C.)
Hydrogen flow rate: 30 ml/min
Air flow rate: 250 ml/min
Chart speed: 1 cm/min

| HP 5830 settings | attenuation 2 ↑ | 5 |
| --- | --- | --- |
| | slope sensitivity | 0.05 |
| | area reject | 50 |

After the sample is injected, the oven temperature is maintained at 140° F. (60° C.) for 5 minutes. Then the oven is programmed to rise 4° C./min. to a final temperature of 320° F. (160° C.) and is held at 320° F. (160° C.) for 8 minutes. Minor variations may be made to the temperature program to provide adequate resolution.

F. Gas Chromatographic Analysis: Procedure

1. Using a 100 ml graduated cylinder, 65 ml of the brewed coffee is added to the sample bottle containing the salt (sodium sulfate), and the bottle is restopped with a septum. Immediately, with a pipet, 1 ml of 1000 ppm ethyl acetate internal standard solution is added and the bottle is quickly restopped with a septum. The septum is then crimped securely to the sample bottle.

2. The contents of the bottle are mixed by swirling until all of the salt has dissolved and the sample is completely dispersed, leaving clean walls inside the bottle. Note: vigorous shaking prior to this point will produce excessive foam which will prevent adequate agitation. The bottle is shaked vigorously for 10 seconds and placed in a 203° F. (95° C.) oven. A 2 ml. gas syringe is obtained, modified with a 1 ml. volume stop and supplied with a 1" side port needle. This syringe is placed in the oven along with the sample bottle. A timer is set for 45 minutes.

3. At the end of 45 minutes an asbestos glove is used to remove the bottle from the oven. Holding the septum on with the forefinger of the gloved hand, the sample is shaked vigorously for 30 seconds.

4. The bottle is allowed to stand for a few seconds to drain. The center of the septum is tapped hard with the forefinger several times to dislodge any bubbles across the inside bottom of the stopper.

5. The gas syringe is removed from the oven and, using a deliberate motion, 1 ml of headspace is drawn into the syringe. The plunger is held up 1-2 seconds and then the needle is withdrawn from the septum and the sample is expelled into the air. The needle is immediately reinserted and a second sample is taken, using the same technique as before. This sample is injected into the chromatograph and analyzed under the conditions listed above.

6. Immediately after injection, the syringe is flushed by drawing in and expelling room air. If clean nitrogen is available, it is helpful to periodically remove the plunger and blow out the syringe with nitrogen. If liquid from the sample bottle is inadvertently drawn into the syringe, the plunger is removed and the syringe is flushed thoroughly with distilled water. The water is removed by rinsing with methanol. If clean nitrogen is available, the syringe is blown out with nitrogen. The syringe (with plunger out) is placed in a 221° F. (105° C.) oven for 25 minutes to drive off all traces of the methanol. After removal from the oven, the syringe is reassembled and the plunger is worked to clear the needle.

G. Calculation of Peak Areas

The peaks for diketones, aldehydes and the internal standard are identified. The peak areas are recorded as number of GC counts. The normalized GC counts of the individual components is calculated as a percentage of the area of the internal standard, using the formula below:

$$\text{Normalized GC Counts Compound A} = \frac{\text{Area of Compound A} \times 100}{\text{Area of Ethyl Acetate}}$$

Figure 3:
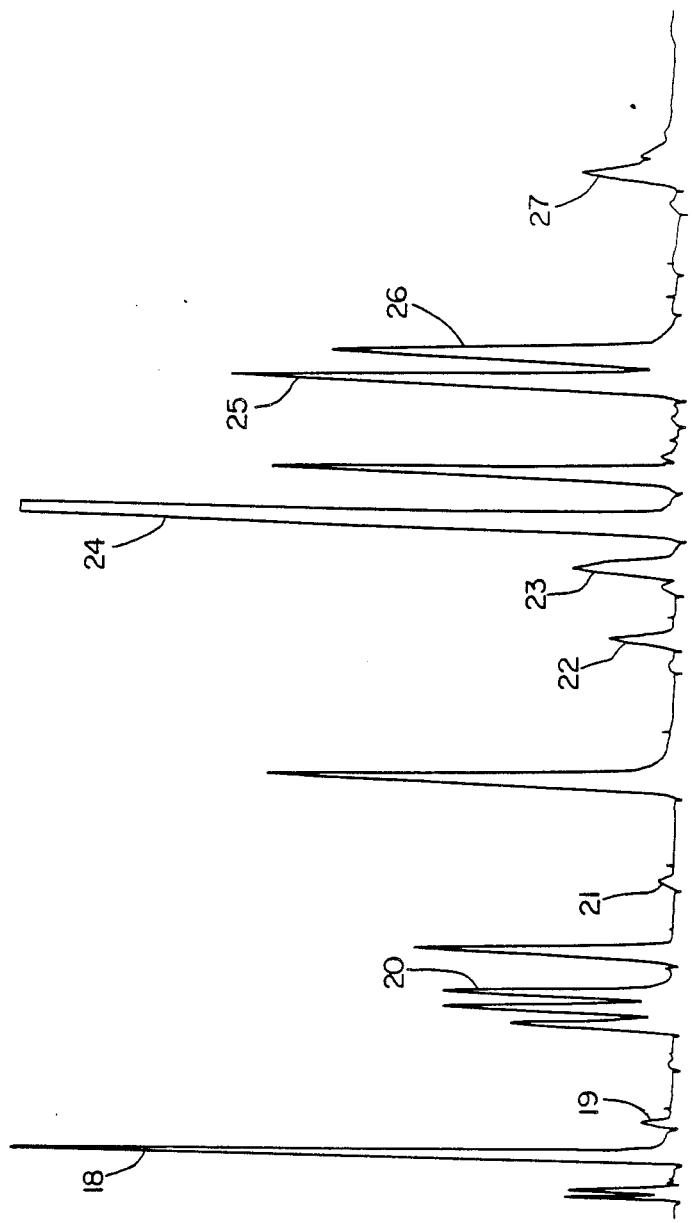
FIG. 3 illustrates a gas chromatogram obtained from the GC Analysis of Headspace analytical method.

FIG. 3 illustrates a gas chromatogram from the GC Analysis of Headspace analytical method. The peaks are labeled by numbers 18 through 27 which correspond to the following compounds: ethanal (18); methylformate (19); 2-propanone (20); methylacetate (21); 2-butanone (22); 2,3-butanedione (23); Internal Standard (ethyl acetate) (24); 2-methylbutanal (25); 3-methylbutanal (26); and 2,3-pentanedione (27).

The following examples are intended only to further illustrate the invention and are not intended to limit the scope of the invention which is defined by the claims.

EXAMPLE 1

A coffee product is prepared from a blend of green Arabica and Robusta coffee beans having about a 2:1 ratio of Arabica to Robusta and having the following initial Hunter colors: L-color of 42, a-color of 1.42, b-color of 13.17. A 200-lb. batch of the beans is roasted for 5¼ minutes at 500° F. (260° C.) under atmospheric pressure in a Thermalo roaster (Jabez Burns, Div. of Blaw-Knox, Pittsburgh, Pa.) The beans are then quenched with cool water until their moisture content is 4.5% by weight. The Hunter colors of the beans after the partial roasting step are: L-color of 38.76, a-color of 6.35, b-color of 15.23.

Ten pounds of the partially roasted beans are soaked in a coffee bean extract solution at a temperature of 80° F. (27° C.) for 2 hours at atmospheric pressure. The extract solution is prepared by combining 9.5 liters of green bean liquor, 5 lbs. of sugar (sucrose), and 0.5 grams of ammonium hydroxide solution (35% active, 65% water). The green bean liquor is obtained by coarsely grinding green coffee beans, soaking them in room temperature water for 24 hours with a weight ratio of water to beans of about 4.5:1, then decanting off the resulting liquor from the coffee grinds. The extract solution has a solids content of 4.5%.

After soaking in the coffee bean extract solution, the solution is drained from the beans, and the beans are rinsed with water, then air dried to a moisture content of 10%. Next the beans are roasted for 4¼ minutes at 500° F. (260° C.) (atmospheric pressure) to a final Hunter L-color of 20, using a Probat roaster (Probat-Werke, Emmerich, Germany). The roasted beans are cracked, ground, and normalized to a typical automatic drip coffee grind.

The product contains the following characterizing concentrations of volatiles:

| Volatile Compound | Concentration (GC Counts) | Volatile Compound | Concentration (GC Counts) |
|---|---|---|---|
| 2-propanone | 1.13 | phenol | 0.061 |
| 2-butanone | 0.32 | guaiacol | 0.112 |
| 2,3-butanedione | 0.97 | ethylguaiacol | 0.152 |
| 2,3-pentanedione | 1.20 | vinylguaiacol | 1.173 |
| 2-methylbutanal | 4.10 | methylpyrazine | 1.407 |
| 3-methylbutanal | 3.12 | 2-ethylpyrazine | 0.296 |
| ethanal | 1.91 | 2,6-dimethylpyrazine | 1.082 |
| methyl acetate | 0.01 | 2,3-dimethylpyrazine | 0.11 |
| methyl formate | 0.05 | 2-ethyl-6-methylpyrazine | 0.197 |
| furfural | 4.487 | 2-ethyl-3,6-dimethylpyrazine | 0.111 |
| 5-methylfurfural | 2.368 | 2,3,5-trimethylpyrazine | 0.203 |
| furfuryl acetate | 0.113 | 2-ethyl-3-methylpyrazine | 0.068 |
| furfuryl alcohol | 2.362 | | |

The f(d) value of the product calculated from these volatile concentrations is:

$$f(d) = \frac{\text{ketones + diketones + aldehydes}}{\text{methyl esters}} + 30\left(\frac{\text{furfural + furfural derivatives}}{\text{phenolics + substituted pyrazines}}\right)$$

$$f(d) = 212.500 + 30\ (1.877)$$

$$= 268.795$$

The coffee product is found to be richer tasting than conventional coffees and to have an aroma containing fewer unpleasant aroma notes.

EXAMPLE 2

A coffee product is prepared from a blend of green Arabica and Robusta coffee beans having about a 2:1 ratio of Arabica to Robusta and having the following initial Hunter colors: L-color of 42, a-color of 1.42, b-color of 13.17. A 200-lb. batch of the beans is roasted in a Thermalo roaster for 5½ minutes at 500° F. (260° C.) under atmospheric pressure. The beans are then quenched with cool water until their moisture content is 5.5% by weight. The Hunter colors of the beans after the partial roasting step are: L-color of 38.76, a-color of 6.35, b-color of 15.23.

Ten pounds of the partially roasted beans are soaked in an aqueous alkaline solution made of 20.9 lbs. of water, 0.5 grams of ammonium hydroxide solution (35% active, 65% water), and 5 lbs. of sugar (sucrose). The pH of the solution is 8.7. The beans are soaked in the solution at a temperature of 80° F. (27° C.) for 2 hours at atmospheric pressure. After soaking, the solution is drained from the beans, and the beans are rinsed with water, then air dried to a moisture content of 10%. Next the beans are roasted in a Probat roaster for 4½ minutes at 500° F. (260° C.) (atmospheric pressure) to a final Hunter L-color of 20. The roasted beans are cracked, ground, and normalized to a typical automatic drip coffee grind.

The product contains the following characterizing concentrations of volatiles:

| Volatile Compound | Concentration (GC Counts) | Volatile Compound | Concentration (GC Counts) |
|---|---|---|---|
| 2-propanone | 1.50 | phenol | 0.071 |
| 2-butanone | 0.44 | guaiacol | 0.128 |
| 2,3-butanedione | 0.96 | ethylguaiacol | 0.171 |
| 2,3-pentanedione | 1.44 | vinylguaiacol | 1.201 |
| 2-methylbutanal | 5.12 | methylpyrazine | 1.211 |
| 3-methylbutanal | 3.46 | 2-ethylpyrazine | 0.277 |
| ethanal | 2.13 | 2,6-dimethylpyrazine | 1.061 |
| methyl acetate | 0.07 | 2,3-dimethylpyrazine | 0.097 |
| methyl formate | 0.07 | 2-ethyl-6-methylpyrazine | 0.199 |
| furfural | 4.527 | 2-ethyl-3,6-dimethylpyrazine | 0.121 |
| 5-methylfurfural | 2.645 | 2,3,5-trimethylpyrazine | 0.197 |
| furfuryl acetate | 0.132 | 2-ethyl-3-methylpyrazine | 0.067 |
| furfuryl alcohol | 2.481 | | |

The f(d) value of the product calculated from these volatile concentrations is:

$$f(d) = \frac{\text{ketones + diketones + aldehydes}}{\text{methyl esters}} + 30\ \frac{\text{furfural + furfural derivatives}}{\text{phenolics + substituted pyrazines}}$$

$$f(d) = 107.500 + 30\ (2.038)$$

$$= 168.644$$

The coffee product tastes rich and is low in unpleasant aroma.

EXAMPLE 3

A coffee product is prepared as in Example 1, except that a vacuum is used with the soaking. The beans are mixed with the solution, and then the beans and solution are placed under a vacuum of 25 mm Hg. The soaking time is shortened to 15 minutes.

EXAMPLE 4

A coffee product is prepared as in Example 1, except that the beans are sprayed with the solution instead of being soaked in the solution. The beans are placed in a tumble dryer, and the solution is sprayed on the beans, at a temperature of 200° F. (93° C.) for 20 minutes. The beans are agitated in the tumble dryer during spraying.

EXAMPLE 5

A coffee product is prepared as in Example 1, with the additional step that the coffee beans are pre-dried to a moisture content of 3% between the initial partial roasting step and the treatment solution step. The beans are pre-dried by heating at a temperature of 250° F. (121° C.) for 10 minutes.

EXAMPLE 6

A blend of Arabica and Robusta coffee beans is roasted in a continuous roaster for 5½ minutes at 500° F. (260° C.) to the following Hunter colors: L-color of 39, a-color of 6.5. Then pounds of the partially roasted beans are soaked in an alkaline solution made of 9.5 liters of water and 4.2 ppm NaOH. The pH of the solution is 8.7. The beans are soaked in the solution at a temperature of 80° F. (27° C.) for 4 hours. After soaking, the solution is drained from the beans, and the beans are dried to a moisture content of 10%. Next the beans are roasted for 4½ minutes at 500° F. (260° C.) to a final Hunter L-color of 20. The roasted beans are cracked, ground, and normalized to a typical automatic drip coffee grind. The coffee product tastes richer and has less unpleasant aroma than the same coffee roasted in a single step without treatment by solution.

EXAMPLE 7

A coffee product is prepared as in Example 6, except that the beans are soaked in 9.5 liters of a coffee bean extract solution instead of an alkaline solution. The extract solution is made by grinding green beans and then soaking them for 24 hours in 19 liters of water. The solution contains about 4.5% coffee solids. The resulting coffee product is richer tasting and has less unpleasant aroma than standard coffees.

What is claimed is:

1. A process for treating coffee beans to make a better-tasting coffee, comprising the steps of:
   (a) partially roasting green coffee beans to a Hunter a-color between about 3 and about 9, under roasting conditions sufficient to increase the Hunter a-color of the beans by at least about 1.5 a-color units during the partial roasting; then
   (b) treating the partially roasted beans with an aqueous alkaline solution comprising water and a food-grade base, at a temperature between about 40° F. (4° C.) and about 350° F. (177° C.) for a time between about 5 seconds and about 48 hours; and then
   (c) final roasting the treated beans to a Hunter L-color between about 16 and about 24, under roasting conditions sufficient to lower the Hunter L-color of the beans by at least about 10 L-color units during the final roasting step.

2. A process according to claim 1 wherein the Hunter a-color of the beans is increased by at least about 3.5 a-color units during the partial roasting step.

3. A process according to claim 1 wherein the beans are treated in step (b) by soaking them in the solution at a temperature between about 65° F. (18° C.) and about 120° F. (49° C.) for a time between about 2 hours and about 24 hours.

4. A process according to claim 1 wherein the weight ratio of solution to beans is between about 1:2 and about 3:1.

5. A process according to claim 1 wherein the beans are treated in step (b) by soaking them in the solution, under a vacuum, at a temperature between about 65° F. (18° C.) and about 120° F. (49° C.) for a time between about 5 seconds and about 1 hour.

6. A process according to claim 5 comprising the additional step, after soaking the beans under a vacuum, of soaking the beans in the solution without a vacuum for a time between about 15 minutes and about 24 hours at a temperature between about 65° F. (18° C.) and about 120° F. (49° C.).

7. A process according to claim 1 wherein the beans are treated in step (b) by spraying them with the solution at a temperature between about 160° F. (71° C.) and about 350° F. (177° C.) for a time between about 10 minutes and about 20 hours.

8. A process according to claim 1 wherein the beans are treated in step (b) by spraying them with the solution, under a vacuum, for a time between about 30 seconds and about 12 hours.

9. A process according to claim 8 comprising the additional step, after spraying the beans under a vacuum, of spraying the beans with the solution without a vacuum for a time between about 5 minutes and about 48 hours at a temperature between about 40° F. (4° C.) and about 350° F. (177° C.).

10. A process according to claim 1 wherein the solution additionally comprises from about 0.05% to about 27% good flavor precursor by weight of the solution, and wherein the flavor precursor is selected from the group consisting of sugars and amino acids and mixtures thereof.

11. A process according to claim 1 wherein the Hunter L-color of the beans is lowered by at least about 15 L-color units during the final roasting step (c).

12. A process according to claim 1 wherein the moisture content of the beans is adjusted to between about 1.5% and about 7% by weight between steps (a) and (b).

13. A process according to claim 1 wherein the alkaline solution has a pH above about 8.

* * * * *

UNITED STATES PATENT AND TRADEMARK OFFICE
CERTIFICATE OF CORRECTION

PATENT NO. : 4,985,271
DATED : January 15, 1991
INVENTOR(S) : Diane H. R. Neilson et al.

It is certified that error appears in the above-identified patent and that said Letters Patent is hereby corrected as shown below:

On the title page, Item [75] Inventors", the name of James P. McCarthy should be deleted.

Column 9, line 12, "f(d)" should be deleted.

Column 15, lines 3, 4 and 5, these three lines should be indented under the words "Flame ionization detector:", which appears on line 2.

Column 18, line 64, "Then pounds" should be --Ten pounds--.

Signed and Sealed this

Sixth Day of April, 1993

Attest:

STEPHEN G. KUNIN

Attesting Officer

Acting Commissioner of Patents and Trademarks